US008775838B2

(12) United States Patent
Lee et al.

(10) Patent No.: US 8,775,838 B2
(45) Date of Patent: Jul. 8, 2014

(54) LIMITING THE NUMBER OF UNEXPECTED WAKEUPS IN A COMPUTER SYSTEM IMPLEMENTING A POWER-SAVING PREEMPTIVE WAKEUP METHOD FROM HISTORICAL DATA

(75) Inventors: Sejoong Lee, Allen, TX (US); Soon-Hyeok Choi, Allen, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 318 days.

(21) Appl. No.: 13/363,949

(22) Filed: Feb. 1, 2012

(65) Prior Publication Data
US 2013/0198540 A1 Aug. 1, 2013

(51) Int. Cl.
*G06F 1/32* (2006.01)
*G06F 11/34* (2006.01)
*G06F 9/48* (2006.01)

(52) U.S. Cl.
CPC ... *G06F 1/32* (2013.01); *G06F 9/48* (2013.01); *G06F 1/3206* (2013.01); *G06F 11/34* (2013.01)
USPC .......................................................... 713/320

(58) Field of Classification Search
CPC ............... G06F 1/26; G06F 1/28; G06F 1/30; G06F 1/3206; G06F 9/48; G06F 9/4812; G06F 9/4887; G06F 11/34; G06F 11/3423; G06F 1/32
USPC .......................................................... 713/320
See application file for complete search history.

(56) References Cited

U.S. PATENT DOCUMENTS

| 6,748,546 | B1 * | 6/2004 | Mirov et al. ................... 713/320 |
| 7,792,066 | B2 | 9/2010 | Fujii et al. |
| 7,962,314 | B2 * | 6/2011 | Chernoff ........................ 702/186 |
| 8,612,786 | B1 * | 12/2013 | Lachwani et al. ............. 713/322 |

(Continued)

FOREIGN PATENT DOCUMENTS

| EP | 1008030 B1 | 4/2007 |
| KR | 1019970066802 A | 10/1997 |

OTHER PUBLICATIONS

Saowanee Saewong and Ragunathan Rajkumar, "Practical Voltage-Scaling for Fixed-Priority RT-Systems", Proceedings of the 9th IEEE Real-Time and Embedded Technology and Applications Symposium (RTAS '03), May 27-30, 2003, pp. 106-114.

*Primary Examiner* — Thomas Lee
*Assistant Examiner* — Danny Chan
(74) *Attorney, Agent, or Firm* — John R. Pessetto; Frederick J. Telecky, Jr.

(57) ABSTRACT

Dynamically reducing power consumption by a processor in a computer system by determining a maximum number of times (token count) that the processor can incur a start-up delay after being placed into a low-power mode during a token period of time when executing a task for a token period of time. The processor may be placed into the low-power mode while executing the task in response to an idle indicator only if a current value of the token count assigned to the task is greater than zero. The current value of the token count is decremented each time the processor incurs a start-up delay in response to being awakened from the low-power mode. The current token count is reset to match the assigned token count at the end of each token period. Furthermore, wakeup may be anticipated to allow the processor to be awakened preemptively.

5 Claims, 7 Drawing Sheets

(56) References Cited

U.S. PATENT DOCUMENTS

| | | |
|---|---|---|
| 2010/0100716 A1* | 4/2010 | Scott et al. .................. 713/1 |
| 2010/0332877 A1 | 12/2010 | Yarch et al. |
| 2011/0173474 A1* | 7/2011 | Salsbery et al. .............. 713/323 |
| 2011/0194471 A1 | 8/2011 | Kim et al. |
| 2011/0252252 A1* | 10/2011 | Ramakrishnan et al. ..... 713/320 |

* cited by examiner

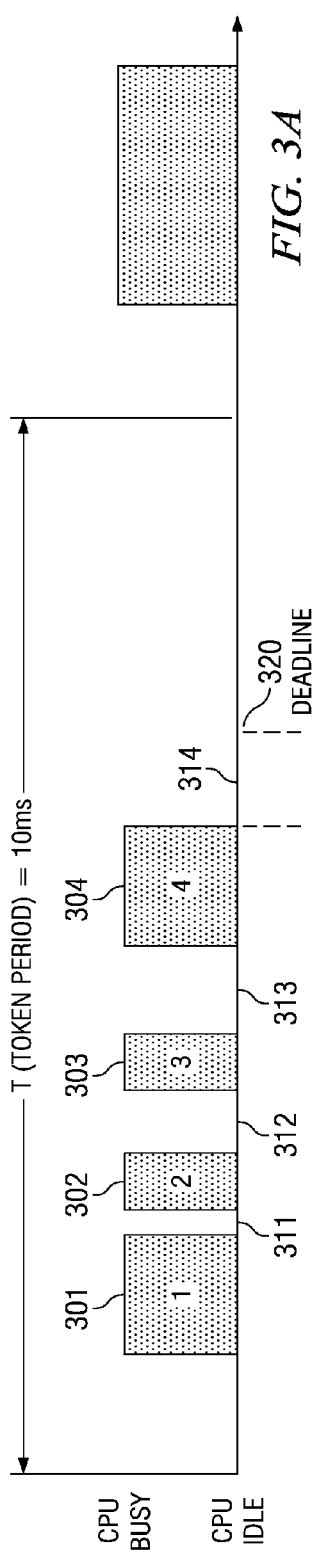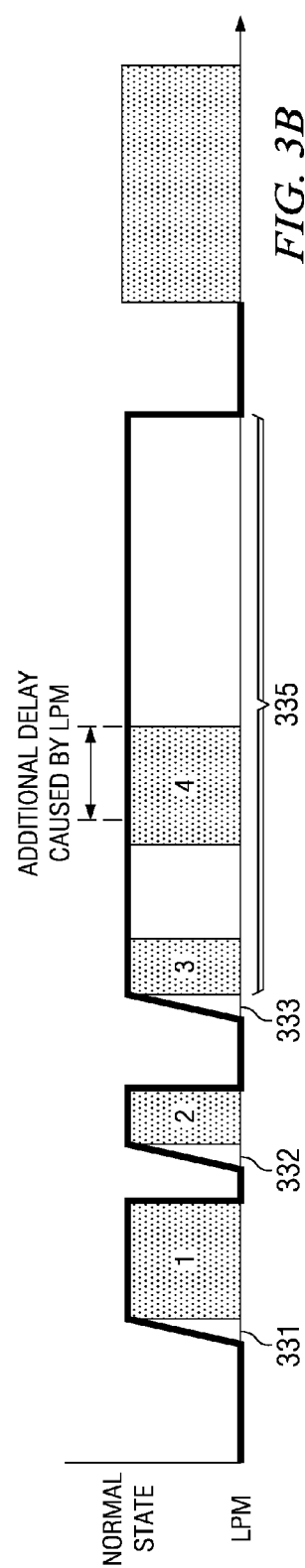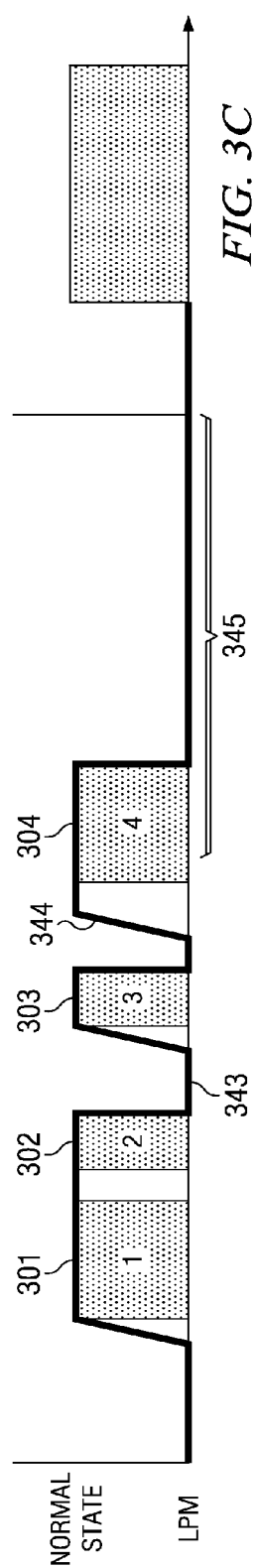

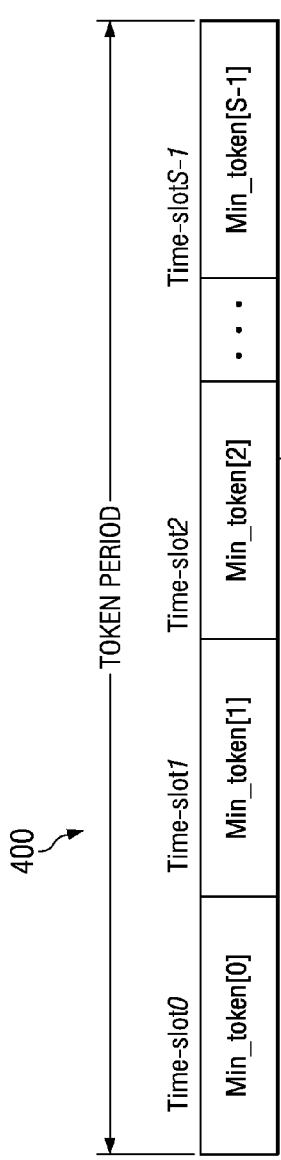

LIMITING THE NUMBER OF UNEXPECTED WAKEUPS IN A COMPUTER SYSTEM IMPLEMENTING A POWER-SAVING PREEMPTIVE WAKEUP METHOD FROM HISTORICAL DATA

FIELD OF THE INVENTION

This invention generally relates to microcontrollers for real time control systems, and in particular to reducing power used by the microcontroller.

BACKGROUND OF THE INVENTION

Computer processors used in real time control systems are typically fabricated using a complimentary metal-oxide semiconductor (CMOS) process. In CMOS circuits, power consumption is proportional to the product of the frequency and the square of the supply voltage. A reduction in the operating frequency of the processor and/or its supply voltage can lead to significant savings in energy consumption and heat dissipation. In a real time system, the processor may be placed into a low power mode (LPM) during idle periods when a task is not being executed. While in the LPM, the processor consumes less power. If the processor receives a request to resume execution, the processor may be awakened from the LPM and the processor will return to a normal power state and resume processing.

BRIEF DESCRIPTION OF THE DRAWINGS

Particular embodiments in accordance with the invention will now be described, by way of example only, and with reference to the accompanying drawings:

FIGS. 3A-3C are timing diagrams illustrating use of tokens for dynamic power management;

FIG. 4 is an illustration of a sleep decision map;

FIG. 5 is an illustration of a wake-up time-slot decision map;

Figure 1A:
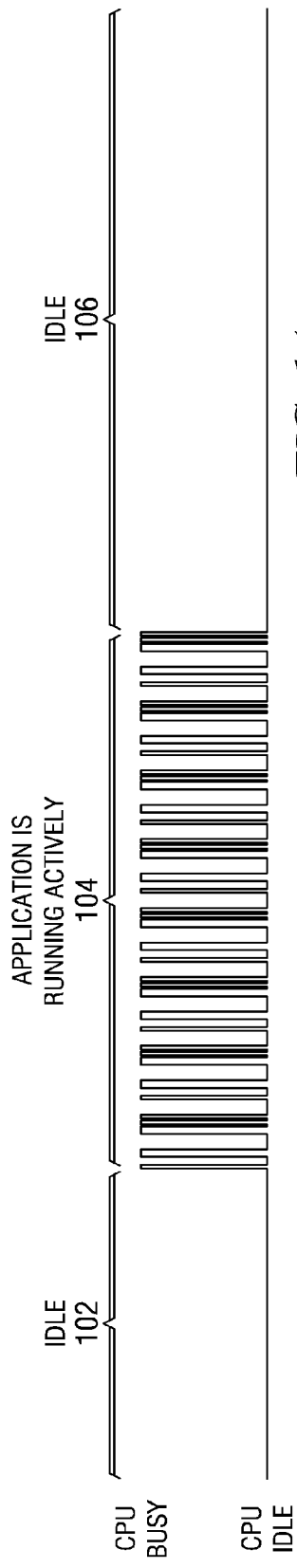
FIGS. 1A-1C compare CPU activity with conventional and dynamic power management.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

A method is described herein that efficiently utilizes a low-power mode (LPM) of a processor in order to reduce the power consumption of the processor. When a processor is idle, the processor may be put into LPM during which the processor provides low performance or even zero performance, while consuming less power. When the processor receives a request to resume execution, the processor is awakened from the LPM and the processor will return to the normal power state and resume the processing.

A problem of using the LPM is that it takes some time to wake up the processor from the LPM to normal state. Such latency causes processing delay of tasks being executed by the processor. In a real time system with hard task deadlines, the processing delays can affect adversely the overall system performance.

A method will now be described that bounds the overall processing delay in order to limit the performance degradation while maximizing the use of LPM of a processor. The dynamic power management system described herein allows use of LPM even while a real time task is actively running. A token scheme is used that can bound the performance degradation by wake-up latency such that the tasks running in the CPU still meet their deadlines. A prediction scheme may also be used that can maximize the use of LPM by monitoring the activity pattern of the CPU.

Use of a low-power mode (LPM) involves state transition overhead. The latency taken by a state change from LPM to normal state as referred to as wake-up latency. The wake-up latency depends on what kinds of mechanism are used in the LPM. For example, if the LPM uses a clock-gating feature only, the wake-up process involves releasing a clock gating signal; therefore, the wake-up latency can be as low as a couple of clock cycles. On the other hand, if the LPM uses power-gating, in which the processor saves internal contexts in another secure or non-volatile memory space during the transition from normal to the LPM, the wake-up latency involves the context-restoring time which may take a couple of milliseconds. In general, a LPM that consumes less power requires longer wake-up latency.

If the wake-up latency of a LPM is negligible, the processor may be put into LPM whenever the processor is idle, and wake it up in the event of a wake-up request, such as a wake-up interrupt. In general, however, the wake-up latency is not negligible, and the latency can adversely impact the overall performance of the system as the latency causes delay in task execution time of the processor.

As a result, previously a typical scenario for power conservation put the processor into LPM only when the application running in the processor is in such state that it is obvious that the wake-up latency can be tolerated at the time of wake-up request. In other words, the LPM is used only when a real time task is not actively running.

Figure 1B:
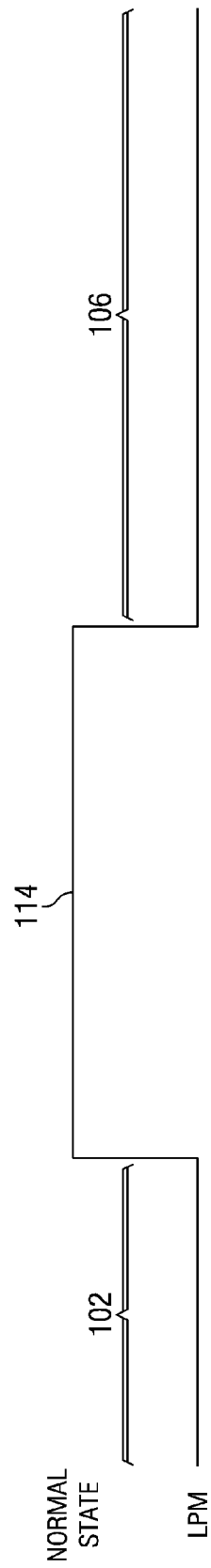
Figure 1C:
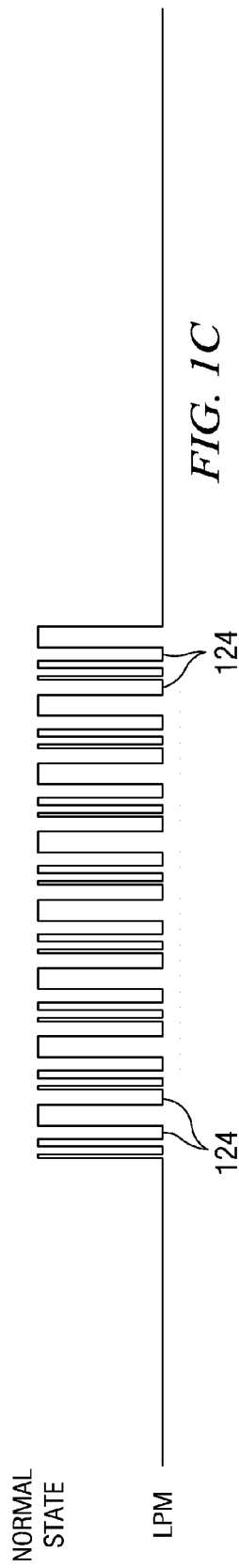

FIGS. 1A-1C compare CPU activity with conventional and dynamic power management. FIG. 1A illustrates an execution pattern for an illustrative real time task. During idle periods 102, 106, the CPU is not executing an active task. During active period 104, the CPU is executing a task, but there may still be periods of idle time during the active period 104.

FIG. 1B illustrates an example of conventional use of LPM, in which LPM is used only when the application is obviously inactive, such as during idle periods 102, 106. While the task is active, the processor remains in the normal power state 114.

FIG. 1C illustrates a method that makes use of LPM modes even when an application is actively running in the processor, as indicated generally at 124.

Figure 2:
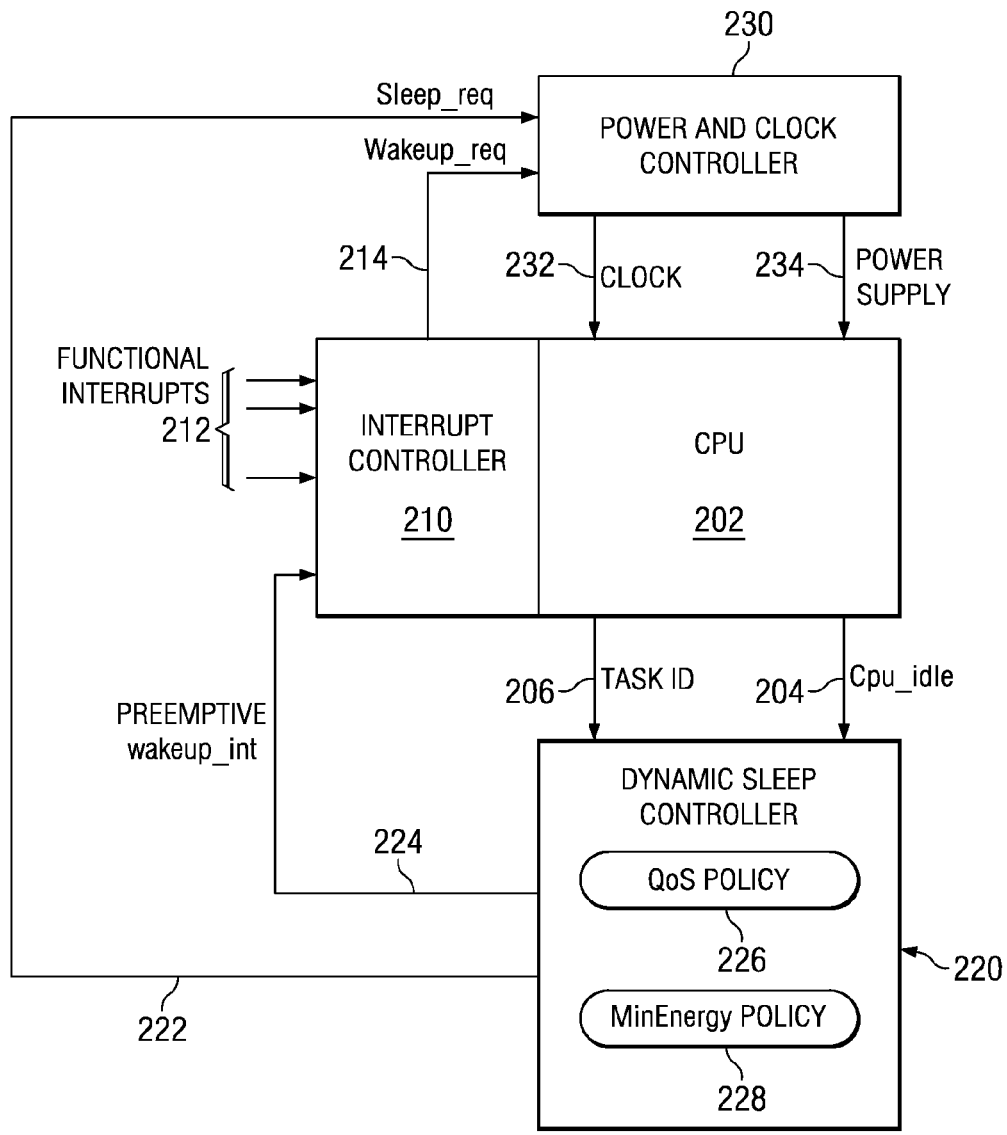
FIG. 2 is a block diagram illustrating dynamic sleep controller (DSC) based CPU power management.

FIG. 2 is a block diagram of an example embodiment of the invention. A Dynamic Sleep Controller (DSC) 220, which can be implemented in software or hardware, monitors the cpu_idle signal 204 which is asserted when CPU 202 is idle. This signal is typically asserted when the processor executes an idle instruction that is included in the task being executed or by an operating system that is scheduling task execution. When the cpu_idle is asserted, DSC 220 determines if it is good time to go to LPM or it is better to stay in normal state. If DSC 220 determines that it is a good time to go to LPM, it asserts sleep_req signal 222. Then, power and clock controller 230 will put the CPU into LPM by changing clock signal 232 and/or power supply 234 voltage levels accordingly.

If interrupt controller 210 detects any unmasked functional interrupt 212, it asserts wakeup_req signal 214, and power and clock controller 230 puts CPU 202 back to a normal power state by restoring clock signal 232 and/or power supply levels 234. As mentioned earlier, CPU 202 may also need to perform a context restore or other housekeeping task before returning to execution of the task. CPU 202 may also be preemptively awakened by DSC 220. DSC 220 can wake up CPU 202 by asserting preemptive wakeup_int signal 224. If the CPU is awakened by preemptive wakeup interrupt 224, and if it then receives another functional interrupt 212 after that, the CPU will be able to process the functional interrupt without incurring any wakeup delay since the wakeup latency occurred in response to the preemptive wakeup request before receiving the functional wakeup request. The DSC may use this proactive wake-up mechanism when it expects a functional interrupt to occur soon.

DSC 220 may perform several dynamic power management functions. When cpu_idle is asserted 204, the DSC determines whether to go to LPM or not. If the DSC determines to choose LPM, it may also determine when it will wake up the CPU. The CPU will experience processing delay due to wake-up latency if a functional interrupt 212 occurs before preemptive wakeup_int 224 is asserted, but the CPU will not experience wake-up latency if a functional interrupt 212 occurs after preemptive wakeup_int 224 is asserted.

DSC 220 manages accumulation of processing delay caused by the wake-up latency so that wake-up latency does not exceed a specified threshold. In this manner, tasks running in the processor meet their deadlines. A Quality-of-Service (QoS) Policy 226 that is available to DSC 220 contains information specific to the application.

The DSC may also try to maximize the use of LPM. MinEnergy Policy 228 contains a set of instructions that attempt to use LPM as much as possible as long as the QoS Policy is met. As discussed above, the instructions may preemptively wake up the CPU ahead of a next functional wake-up request in order to eliminate wake-up latency. Also, the instructions may try to wake up the CPU as late as possible in order to maximize the sleep time. The MinEnergy Policy is generated during run-time based on an activity pattern of the CPU and QoS Policy.

FIG. 2 illustrates an embodiment in which the DSC manages only one CPU. In other embodiments, a DSC may manage multiple CPUs as long as the DSC has enough bandwidth and resources to handle that many CPUs. In some multi-CPU architectures, it may be beneficial to implement signals such as sleep_req 222, preemptive wakeup_int 224, and cpu_idle 204 using bus transaction commands delivered through a bus interconnect rather than dedicated hardwire signals in order to minimize signal routing and to provide better scalability.

Quality of Service Policy

An embodiment of QoS Policy and MinEnergy Policy will now be described in detail. The case where the CPU is in LPM and is awakened up by a functional interrupt rather than a preemptive wakeup_int will be referred to herein as mis-prediction. In each mis-prediction occurrence, the DSC has failed to predict the correct wake-up time and the DSC did not awaken the CPU promptly. When mis-prediction occurs, the task processing will be delayed by the amount of wake-up latency. The QoS Policy describes how many times and how often such mis-prediction can be tolerated by the system.

Table 1 shows an example of QoS Policy 226. It includes multiple token constraints. A token constraint includes two parameters: the number of tokens and a period. One token means that the application running in the CPU can tolerate the processing delay caused by one occurrence of wake-up latency during each specified period. For example, token constraint 1 in Table 2 indicates that the system can tolerate two occurrences of wake-up latency for every 1 ms token period. Therefore, if the system has experienced two occurrences of wake-up latency within 1 ms, the DSC will not use LPM again during that token period in order to avoid any additional processing delay. During the next 1 ms token period, the DSC may use the LPM again. However, it can now tolerate only one occurrence of wake-up latency during the next 1 ms because of the token constraint 2. Thus, a hierarchical token constraint policy allows a number of wake-up latencies to be specified for a longer period such as 10 ms, while preventing all of the allowable wake-up latencies from being incurred in a short period.

TABLE 1

| Token Constraints | | |
| --- | --- | --- |
| Token constraint ID | Number of tokens | Token Period |
| 1 | 2 | 1 ms |
| 2 | 3 | 2 ms |
| ... | ... | ... |
| N | 5 | 10 ms |

The token-based QoS Policy described above is effective to bound the performance degradation caused by the use of LPM. Soft real-time applications, which have throughput requirements, can use the token-based QoS Policy while maintaining the performance above a certain threshold.

The token-based QoS Policy is also very effective to guarantee deadline of real-time tasks. In real-time systems, a task $T_i$ is typically modeled by (C, T, D) parameters, where is worst-case execution time, T is the period of the task, and D is the relative-deadline of $T_i$ respectively. This modeling may be done using known simulation and analysis techniques.

Once the C, T, and D parameters are determined for each task, a token constraint may be computed for each task by analyzing slack time of each task. Slack time is the amount of time left over after the worst-case execution time. The slack time of each task can be directly translated into the number of tokens by dividing the slack time by the LPM wake-up latency. As discussed earlier, the LPM wake-up latency depends on how deeply the processor has been put to sleep. The token period may be selected to be the same as the T parameter of the task. Each task will produce one token constraint. After the analysis of a given set of tasks, a set of tuple $(TK_i, T_i)$ is obtained, where $TK_i$=the number of Tokens for task i, and $T_i$=the parameter T of task i. If $TK_i \leq TK_j$ and $T_i \geq T_j$, $(TK_i, T_i)$ is more strict constraint than $(TK_j, T_j)$, then $(TK_j, T_j)$ may be ignored.

Minimum Energy Policy

FIGS. 3A-3C are timing diagrams illustrating use of tokens for dynamic power management. MinEnergy Policy 228 describes an optimal timing for use of LPM in order to maximize sleep time of CPU 202. For this example, assume a token constraint (3, 10 ms). FIG. 3A illustrates one 10 ms token period of task execution. During this token period, there are four bursts of task execution activity 301-304 interspersed with idle periods 311-313. The Task activity must be completed prior to deadline time 320. Slack time 314 is the idle period between the end of task processing 304 and deadline time 320. In this example, the wake-up latency can occur at least three times without deadline time 320 being exceeded.

In FIG. 3B, three occurrences of wake-up latency 331-333 have occurred in the middle of a 10 ms token period, therefore, the CPU cannot be placed in LPM again during this token period and therefore remains in the normal power state during the remainder 335 of the 10 ms duration.

On the other hand, FIG. 3C shows another way of using LPM, in which the DSC is able to use LPM for a longer amount of time and thereby save additional power. In this example, when first activity burst 301 finishes, the DSC determines to stay at the normal state. As a result, second activity burst 302 does not cause wake-up latency. As a result, at the end of second activity burst, the number of remaining tokens is still two, since one token was used during the wakeup for activity pattern 301. A second token is used 343 during the wake-up for third activity pattern 303.

DSC 220 successfully wakes up 344 the CPU ahead of fourth activity burst 304. Therefore, wake-up latency did not cause processing delay. This means that the number of remaining tokens is still one.

When the fourth activity burst 305 finishes, DSC 220 still has one remaining token. As a result, it can use LPM during the rest of 10 ms period 345.

Thus, as illustrated in FIG. 3B, it can be seen that using tokens alone to keep track of how often the CPU can be placed in LPM during any token period leads to power savings. However, as illustrated in FIG. 3C, when a minimal energy policy also specifies optimized timing to choose to go to LPM and wake up depending on the number of remaining tokens, an increased power savings may result. A MinEnergy Policy may be defined as follows:

for a given remaining token count, the MinEnergy Policy tells whether to stay at normal power state or go to LPM at each time when CPU becomes idle;

if MinEnergy Policy tells the CPU to go to LPM, it may also tell when to wake the CPU up.

In one embodiment, a MinEnergy Policy may be implemented with two tables referred to as a 'Sleep Decision Map (SDM)' 400 illustrated in FIG. 4 and a Wakeup_time_slot Decision Map (WDM)' 500 illustrated in FIG. 5. The SDM and WDM divide a token period into smaller pieces of time durations called time-slot. The SDM describes the condition to go to LPM for each time-slot. The condition is the number of tokens remaining. For example, if the CPU becomes idle during time-slot 2 (402) and Min_token [2]=3, the DSC may decide to go to LPM only if the number of tokens remaining is equal to or more than three.

DSC 220 uses WDM 500 to decide when to wake the CPU up for each time-slot. Once the DSC decides to go to LPM based on SDM 400, it refers to WDM 500 in order to decide when to wake the CPU up. WDM 500 is a two-dimensional array. For each entry in the array, wakeup_time_slot[w][x] is a time-slot value at which the DSC should wake the CPU if the DSC decides to use LPM at time-slot x and the number of remaining tokens is (w+1).

Time-Slot Based CPU Activity Monitoring

Figure 6:
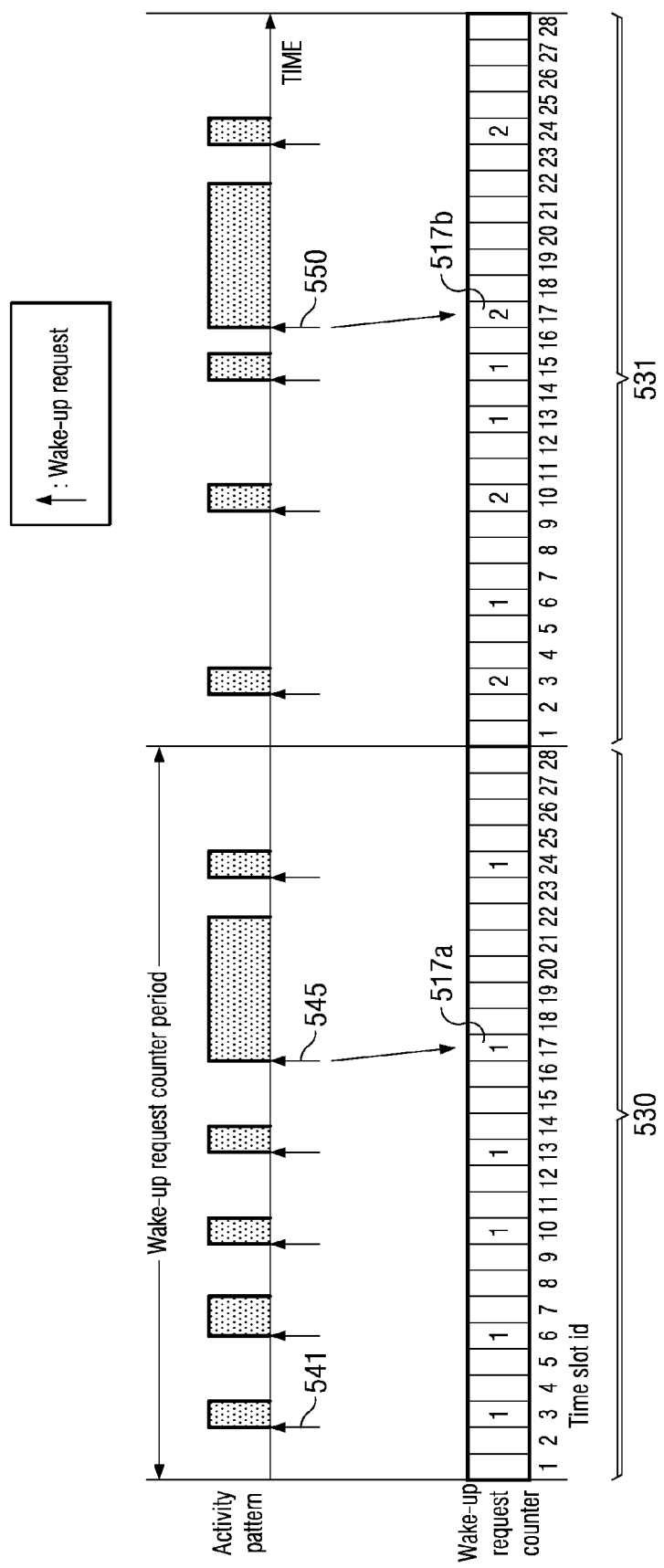
FIG. 6 illustrates formation of a wake-up request histogram.

The MinEnergy Policy including SDM 400 and WDM 500 depends on knowing a CPU activity pattern. FIG. 6 illustrates a procedure of monitoring the activity pattern and gathering statistics. In the example of FIG. 6, the Idle-to-Active event of the CPU is monitored. This is the event that will wake up the CPU if it was in LPM mode, which is wake-up request 214, referring back to FIG. 2.

A token period 530 is pre-defined, and the period is divided into time-slots. If a wake-up request occurs at a certain time-slot, a counter corresponding to the time-slot is incremented. For example, wake-up request 545 is recorded for time slot 17 as indicated at 517a. It should be noted that a finer time-slot means finer resolution of DSC operation.

The counting process is repeated for every period to form a histogram over a specified number of periods. For example, during next token period 531, wake-up event 550 is recorded for slot 17 by incrementing the count to two, as indicated at 517b. After a certain amount of time, the counting process stops, and the final counter value of each time slot is translated into a probability of a wake-up request occurring in that time slot. The resulting set of wake-up probabilities for the time-slots is referred to herein as a wake-up probability map.

Note that the wake-up probability map represents the history of the task activity pattern and the hypothesis is that such statistics of a past activity pattern will be somewhat valid for prediction of near future behavior of the system.

The period of the wake-up probability map should be selected such that the period is somewhat synchronous to wake-up requests, otherwise, the probability distribution of wake-up requests may be flat.

In case of multiple token constraints having different periods, a wake-up probability map may be built for each token constraint. In this case, the different token constraints may be correlated to different tasks that are being executed on the processor. A task ID may be provided to the DSC by the processor to identify what task is currently being executed, as indicated by task ID signals 206 in FIG. 2. Alternatively, processor 202 may write the task ID to DSC 220 over a bus interconnect, for example.

In another embodiment, a single wake-up probability map may be built as long as the map captures wake-up requests synchronously. For instance, a least common multiple of token periods may be used.

SDM and WDM Determination

If DSC puts CPU into LPM at time-slot x and sets wake-up for time-slot x+a, the energy-saving that can be expected is given by equation (1).

$$\text{Energy-saving expectation} = E_{LPM}*(1-P_x) + E_{LPM}*(1-P_x)*(1-P_{x+1}) + E_{LPM}*(1-P_x)*(1-P_{x+1})*(1-P_{x+2}) + \ldots + E_{LPM}*(1-P_x)*(1-P_{x+1})*(1-P_{x+2})*\ldots*(1-P_{x+a-1}) \quad (1)$$

where:

$E_{LPM}$=Energy-saving during one time-slot by putting CPU into LPM $P_k$=Probability of wake-up request in time-slot k The probability P that the token is not consumed so that it can be used later until the end of the period is given by equation (2).

$$P=(1-Px)*(1-Px+1)*(1-Px+2)*\ldots*(1-Px+a-1) \quad (2)$$

When multiple tokens are available, various different scenarios are possible which eventually use up all the tokens while maximizing the sleep time.

Considering all possible scenarios and probabilities associated with the scenarios, an expectation of energy-saving can be computed when the CPU is placed into LPM at time-slot x and a wake-up time-slot is set for time-slot x-Fa. MinToken [x] and Wakeup_time_slot[w][x] may be determined such that the energy-saving expectation is maximized.

Updating Statistics

The SDM and WDM are computed based on the wake-up probability map. As mentioned above, the wake-up probability map represents the history of the task activity pattern, and it was assumed that such a historic pattern may be somewhat valid for prediction of near future behavior of the system. Depending on the dynamics of the system behavior, such history may valid during long or short period of time.

Subsequent probability maps and consequent SDM and WDM can be built continuously in order to represent the most up-to-date characteristics of the system behavior. However, such continuous update computation effort will use additional energy, so there may be a tradeoff between actual power savings and attempts to maximized power savings.

Figure 7:
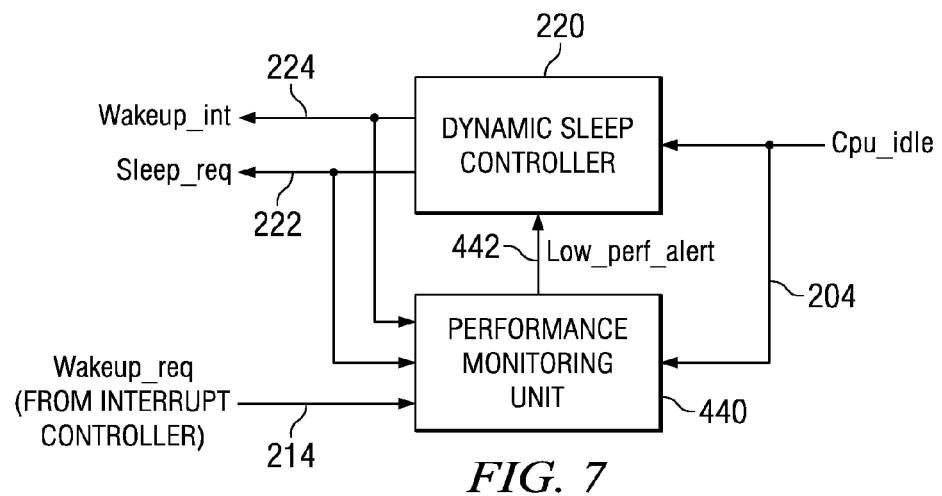
FIG. 7 is a block diagram of a performance monitoring unit that may be included with the microcontroller of FIG. 2.

FIG. 7 is a block diagram of a performance monitoring unit 440 that may be included with the system of FIG. 2. In order to update the probability map, it may be desirable to have a performance monitoring unit 440 that monitors how well DSC 220 is performing. If DSC 220 is not performing well, monitoring unit 440 may trigger a reiteration of building a probability map and consequent SDM and WDM.

The performance monitoring unit may monitor several parameters in order to evaluate the performance of the DSC. The average number of times that CPU 202 receives an interrupt before DSC wakes it up may be monitored. This represents how well the DSC's wake-up mechanism is working. The total sleep time that the CPU spent in LPM vs. the total idle time of CPU may be monitored. This represents how well the DSC's sleep decision mechanism and wake-up mechanism are working.

The performance monitoring unit may alert the DSC to reiterate the probability map if the parameters described above are lower than a selected threshold by asserting alert signal 442.

Figure 8:
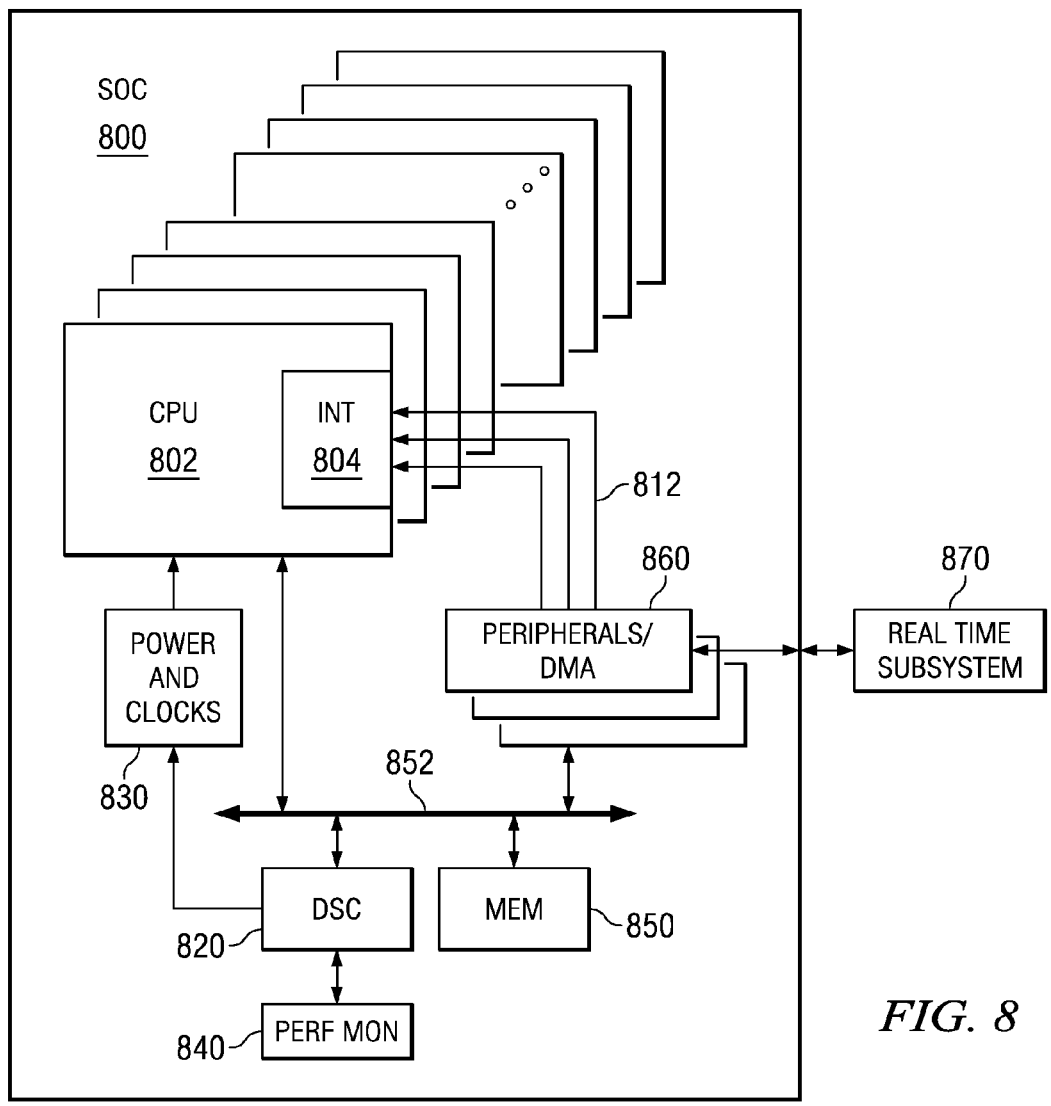
FIG. 8 is a block diagram of an exemplary SoC that includes dynamic power management.

FIG. 8 is a block diagram illustrating an exemplary application specific integrated circuit system on a chip (SOC) 800 with CPU 802. For purposes of this disclosure, the somewhat generic term "microcontroller" (MCU) may be used to apply to any complex digital system on a chip (SOC) that may include one or more processing modules 802, memory 850, and peripherals and/or DMA (direct memory access) controllers 860. At least a portion of memory module 850 may be non-volatile and hold instruction programs that are executed by processing module(s) 802 to perform the system applications. CPU 802 may also be coupled to a data cache and instruction cache, not shown. CPU 802 is coupled to system bus 852 for access to bulk memory 850. Peripherals 860 are also coupled to system bus 852 to allow access and control by CPU 802.

The topology and configuration of SOC 800 is strictly intended as an example. Other embodiments of the invention may involve various configurations of buses for interconnecting various combinations of memory modules, various combinations of peripheral modules, multiple processors, etc. CPU 802 may be any one of the various types of microprocessors or microcontrollers that are now known or later developed. For example, CPU 802 may be a digital signal processor, a conventional processor, or a reduced instruction set processor. As used herein, the term "microprocessor" or CPU is intended to refer to any processor that is included within a system on a chip.

SOC 800 is coupled to real time subsystem (RTS) 870. RTS 870 may be a motor, for example, in which case SOC 800 controls motor speed and direction by controlling the application of voltage to multiple sets of stator windings based on rotor position. In another example, RTS 870 may be a speaker for playing audio sound or music that is converted from a digital stream by SOC 800. For the purpose of the description herein, RTS 870 is any type of device or component now known or later developed that requires some form of hard real-time control.

One or more of the peripheral devices 860 may provide control signals or data signals to RTS 870 and may receive status or other information from RTS 870. For example, if RTS 870 is a motor, peripheral device 860 may receive rotor position data from RTS 870 that generates an interrupt for a new stator control setting. SOC 800 may be part of an automotive engine control system, for example and receive engine position and speed information and provide fuel and spark firing control signals.

As another example, if RTS 870 is a speaker, peripheral device 860 may provide an analog sound signal to RTS 870. Another peripheral module may be accessing a digital stream of audio data and generate an interrupt when a new frame of audio data is available. SOC 800 may be part of a mobile handset and be receiving voice and music digital signals via a cellular telephone network, for example.

DSC 820 may operate as described above in more detail to control clock and voltage levels 830 to each CPU 802. In one embodiment, there may be sixteen CPUs 802 that are provided with dynamic power management by DSC 820. In this example, DSC 820 receives idle indications from the various CPU 802 via transactions across bus 852. Similarly, DSC 820 sends preemptive wakeup interrupts to the various CPU 802 via transactions across bus 852. DSC 820 may be implemented as a hardwired logic, a software controlled microcontroller, a state machine, or other type of logic that performs the dynamic power management function as described above in more detail.

A performance monitoring unit 840 may also be coupled to DSC 820 to monitor the performance of DSC 820 for each of the various CPU 802, as described in more detail above.

Figure 9:
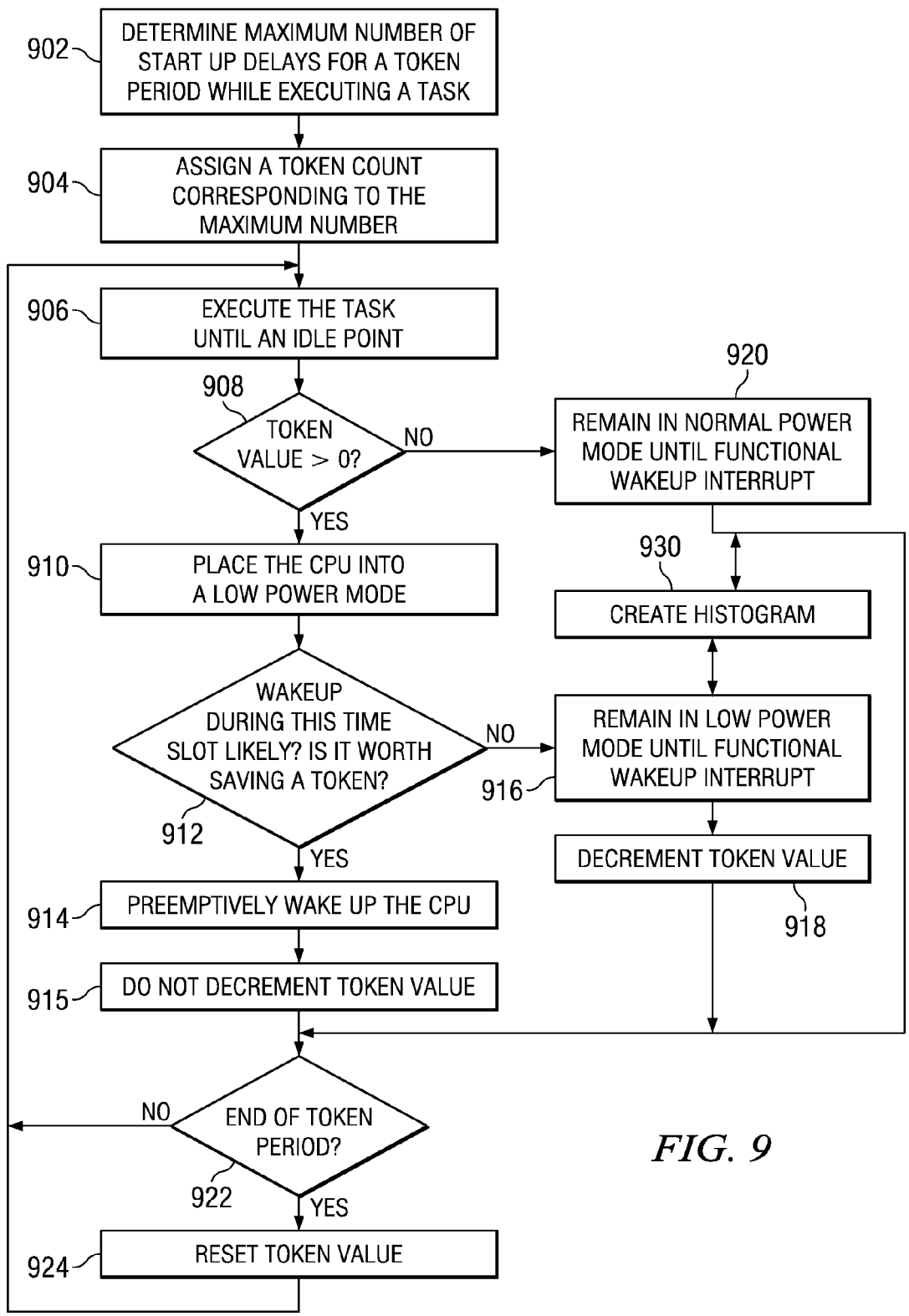
FIG. 9 is a flow diagram illustrating operation of dynamic power management.

FIG. 9 is a flow diagram illustrating operation of dynamic power management for dynamically reducing power consumption by a processor in a computer system. A maximum number of times that the processor can incur a start-up delay after being placed into a low-power mode during a token period of time when executing a task for a token period of time is determined 902. This is generally done while the system is being designed and configured by determining slack time of the task prior to a deadline time and by determining the wakeup latency that will be incurred based on the level of a selected low power mode. In some embodiments, there may be more than one type of low power mode that may be selected.

A token count is assigned 904 for the task in accordance with the determined maximum number of times that the processor can incur a start-up delay for the task. This is done by dividing the slack time for the task by the wakeup latency time. As described earlier, the start-up delay time may vary depending on what level of low power mode the processor is placed into.

The task is executed 906 until an idle point is reached. At this point, the processor will assert an idle signal to indicate that useful processing has stopped. As mentioned above, this may be in response to executing an idle instruction that is part of the task or part of an operating system that is controlling scheduling of the task.

The processor is placed 910 into the low-power mode while executing the task in response to the idle indicator only if a current value of the token count assigned to the task is greater than zero 908. The actual threshold number may be different than zero, depending on the activity pattern of the processor which is captured by the histogram 930. The threshold value may also depend on the current time-slot value at which the idle point has been detected. FIG. 4 is an example of such threshold policy, where each Min_token[x] of time-slot x is determined based on the histogram.

Execution of the task is resumed by waking 916 the processor out of the low-power mode. This generally occurs as a result of a functional interrupt produced by a device or peripheral within the system, or by a counter or timer, for example.

The current value of the token count of the task is decremented 918 each time the processor incurs a start-up delay in response to being awakened from the low-power mode.

The current token count is reset 924 to match the assigned token count at the end of each token period 922.

A time when the processor is likely to be awakened may be anticipated 912 and the processor may then be preemptively awakened 914 by a dynamic sleep controller prior to the anticipated time such that a start-up delay is not incurred. In this case, the current value of the token counter is maintained 915 when a start-up delay is not incurred when the processor starts processing. Even though the processor is likely to be awakened, the dynamic sleep controller may decide to not preemptively awaken the processor if the expected energy-saving from the small probability that the processor may not be awakened is worth possibly using a token.

A wake-up interrupt signal is asserted 916 to wake the processor out of the low power mode when the processor is in a low-power mode and to restart task execution 920 when the processor did not enter low power mode.

A histogram of wake-up interrupt occurrences during the token period may be occasionally created 930 for a plurality of time slots. Each reiteration of the histogram may be done in response to a performance alert from monitoring unit 440, for example. A sleep ratio of total sleep time in the low-power mode versus total idle time of the processor during a period of time may be determined by monitoring unit 440 and the histogram may be reset when the sleep ratio is lower than a sleep ratio threshold. The monitoring unit may determine a wakeup ratio of how many times a wakeup interrupt is received prior to preemptively waking the processor during a period of time, referred to as prediction failure, and then reset the histogram when the wakeup ratio is greater than a wakeup ratio threshold. When the monitoring unit counts the prediction failure, it may disregard a situation in which the dynamic sleep controller intentionally did not awaken the processor 912 because it was not worth saving a token.

Alternatively, the histogram may be reset at a periodic rate that is determined during system design, for example. Typically, the histogram will exclude preemptive wake-up requests generated by the dynamic sleep controller.

A time slot with a histogram value above a threshold value may be selected as the anticipated time when the processor is likely to be awakened 912.

After creating a histogram 930, the DSC may determine for each time slot of the histogram a potential energy-saving that may be achieved by saving a token for later use. While the processor is in a low-power mode, a time slot may be selected 912 as a preemptive wake-up time slot and a preemptive wakeup request is asserted 914 by the dynamic sleep controller if the histogram indicates it is likely that the processor will be awakened by a wake-up interrupt during the time-slot and if it is probable that a potential energy-saving that can be achieved by saving a token for later use is higher than an energy-saving that might be achieved by continuing the sleep at the time-slot, as explained in more detail with regard to equations (1) and (2) by using SDM 400 and WDM 500, for example.

Other Embodiments

While the invention has been described with reference to illustrative embodiments, this description is not intended to be construed in a limiting sense. Various other embodiments of the invention will be apparent to persons skilled in the art upon reference to this description. For example, a single DSC may provide dynamic power control for a single processor or for multiple processor cores within a system on a chip.

Embodiments of the dynamic sleep manager and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized accelerators. A stored program in an onboard or external (flash EEP) ROM or FRAM may be used to implement aspects of the dynamic power management.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical connection, and/or through a wireless connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for dynamically reducing power consumption by a processor in a computer system, the method comprising:
   determining a maximum number of times that the processor can incur a start-up delay after being placed into a low-power mode during a token period of time when executing a task for the token period of time;
   assigning a token count for the task in accordance with the determined maximum number of times that the processor can incur a start-up delay for the task;
   executing the task until a reaching an idle point;
   placing the processor into the low-power mode while executing the task in response to an idle indicator only if a current value of the token count assigned to the task is greater than zero;
   resuming execution of the task by waking the processor out of the low-power mode;
   decrementing the current value of the token count of the task each time the processor incurs a start-up delay in response to being awakened from the low-power mode; and
   resetting the current token count to match the assigned token count at the end of each token period;
   asserting a wake-up interrupt signal to wake the processor out of the low power mode when the processor is in a low-power mode;
   creating a histogram of wake-up interrupt occurrences during the token period for a plurality of time slots;
   determining for each time slot of the histogram a potential energy-saving that may be achieved by saving a token for later use; and
   wherein while the processor is in a low-power mode, a time slot is selected as a preemptive wake-up time slot and a preemptive wakeup request is asserted by a dynamic sleep controller if the histogram indicates it is likely that the processor will be awakened by a wake-up interrupt during the time-slot and if it is probable that a potential energy-saving that can be achieved by saving a token for later use is higher than an energy-saving that might be achieved by continuing the sleep at the time-slot.

2. The method of Claim 1 wherein the histogram excludes preemptive wake-up requests generated by the dynamic sleep controller.

3. A computer system, comprising:
   a processor coupled to a memory, wherein the processor is configured to execute a software task stored in the memory;
   an interrupt controller coupled to the processor, wherein the interrupt controller is configured to provide a wakeup request signal to a power controller, wherein the power controller is configured to place the processor into a low power mode; and
   a dynamic sleep controller coupled to receive an idle signal from the processor, wherein the dynamic sleep controller is configured to:
      send a signal to the power controller to place the processor into the low-power mode in response to an idle indicator only if a current value of a token count assigned to the task is greater than zero, wherein the token count indicates a maximum number of times that the processor can incur a start-up delay after being placed into a low-power mode during a token period of time when executing a task for the token period of time;
      decrement the current value of the token count of the task each time the processor incurs a start-up delay in response to being awakened from the low-power mode; and
      reset the current token count to match the assigned token count at the end of each token period;
   wherein the dynamic sleep controller is further configured to:
   create a histogram of wake-up interrupt occurrences during the token period for a plurality of time slots;
   determine for each time slot of the histogram a potential energy-saving that may be achieved by saving a token for later use; and
   wherein while the processor is in a low-power mode, a time slot is selected as a preemptive wake-up time slot and a preemptive wakeup request is asserted by a dynamic sleep controller if the histogram indicates it is likely that the processor will be awakened by a wake-up interrupt during the time-slot and if it is probable that a potential energy-saving that can be achieved by saving a token for later use is higher than an energy-saving that might be achieved by continuing the sleep at the time-slot.

4. The system of Claim 3, wherein the dynamic sleep controller is further configured to exclude preemptive wake-up requests generated by the dynamic sleep controller while creating the histogram.

5. The system of Claim 3, wherein the dynamic sleep controller is further configured to determine a sleep ratio of total sleep time in the low-power mode versus total idle time of the processor during a period of time; and to reset the histogram when the sleep ratio is lower than a sleep ratio threshold.

* * * * *